United States Patent Office 2,710,244
Patented June 7, 1955

2,710,244

TREATMENT OF KAOLIN

Orlando Leonard Bertorelli, Borger, Tex., assignor to J. M. Huber Corporation, Locust, N. J., a corporation of New Jersey No Drawing. Application February 17, 1951, Serial No. 211,580

4 Claims. (Cl. 23—110)

This invention relates to kaolin and, more particularly, to the treatment of kaolin to improve its properties.

Kaolin is a mineral composed chiefly of kaolinite and is found in large quantities in Georgia and South Carolina. As obtained from the mines, kaolin contains about 22% by weight of water and is accompanied by small amounts of gritty material and mica which must be removed from the kaolin or altered before the kaolin is suited for such uses as compounding in rubber or coating of paper. The gritty material and mica can be removed from the kaolin by slurrying it in water containing a small amount of an alkali, as a peptizing agent, to decrease the viscosity of the slurry and to cause the kaolin to remain in suspension while the grit and the mica settle out, then acidifying the purified slurry to coagulate the kaolin, and then separating the kaolin from the water as by settling or filtration and drying.

The greatest proportion of the kaolin, which is used for compounding in rubber, is processed in a dry condition. The kaolin is first dried, as in a rotary dryer, until the moisture is reduced to about 1% or less. The dried kaolin is then fed to a grinder, such as a Raymond mill, which rejects much of the coarse grit and reduces the remainder of the kaolin to a finely-divided form suitable for use in rubber. When such dried and ground kaolin is incorporated into rubber, it has an adverse action on the vulcanization of the rubber, making it necessary to employ higher vulcanization temperatures, longer times, and larger amounts of vulcanization accelerators.

When kaolin, which has been so dried and ground, is suspended in water, it decreases the negative ion and permits the positive ion content of the aqueous phase to increase, thereby producing a system having a pH below 7. The pH, as determined with glass electrodes in aqueous slurries containing 30% by weight of kaolin, will vary in a range of from about 4 to about 5.5, depending upon the particular kaolin or mine from which the sample was obtained. The reason for this effect of the kaolin on the pH of the aqueous phase of its slurries is not known.

Kaolin is not known to be an acid and is not soluble in caustic soda. It may be considered to be the product of the reaction of aluminum hydroxide and meta silicic acid with the elimination of 3 moles of water. Aluminum hydroxide will dissolve in strong caustic, but not in aqueous ammonia. Ammonium meta silicate is not known because, when meta silicic acid is treated with ammonia, it is precipitated to form silica gel.

It is an object of the present invention to improve the properties of raw kaolin. Another object is to alter the porperties of raw kaolin so that, when employed in the compounding of rubber, it will have little or no adverse action on the vulcanization of the rubber. A further object is to treat raw kaolin so that, when it is made into a slurry with water, it will not decrease the pH of the water. Other objects are to provide new compositions of matter to advance the art. Still other objects will appear hereinafter.

The above and other objects may be accomplished in accordance with my invention which comprises drying raw kaolin, grinding it to a finely-divided form and then mixing and reacting the kaolin with from about 0.05% to about 0.1% by weight of ammonia.

I have found that ordinary dry kaolin reacts rapidly with ammonia, the reaction taking place almost instantly when the kaolin is shaken with ammonia gas at atmospheric temperatures, with the generation of heat. The kaolin will react with ammonia in an amount such that, when the reaction product is formed into a 30% slurry in water, the pH of the aqueous phase will be increased to about 9. That portion of the ammonia, which is responsible for a pH of about 7.5 and above, is somewhat loosely held by the kaolin and will slowly volatilize on extended exposure of the kaolin to the air. The remainder of the ammonia is relatively tightly bound to the kaolin and remains combined with it after extended periods of exposure in thin layers to the air, even at elevated temperatures and under reduced pressures.

I have found that kaolin, so treated with ammonia as to produce a pH of from about 7 to about 9 when formed into a 30% slurry with water, has greatly improved properties, particularly for compounding with rubber. The adverse effect of the kaolin on the vulcanization of rubber is thereby largely or substantially wholly eliminated. Such reaction product of kaolin and ammonia is also advantageous for use in aqueous media where reduction of the pH of the media by untreated kaolin would be objectionable.

The amount of ammonia required depends on the particular kaolin, its state of subdivision, and results required. In general, the ammonia will be employed in a proportion of from about 0.05% to about 0.1% by weight based on the kaolin and preferably from about 0.08% to 0.1%. The amount of ammonia required to produce a desired product will increase with decrease in the particle size of the kaolin and with the pH originally produced by the untreated kaolin.

In order to produce the desired results, the kaolin should first be dried and ground to a finely-divided form. This will usually be conducted in the same manner as has been commonly employed for processing kaolin in the dry condition for use in compounding rubber as hereinbefore described. The dried and ground kaolin will then be treated with the ammonia by any method which will thoroughly mix the ammonia with the kaolin and brings the surfaces of the particles of kaolin into contact with the ammonia. This will usually be accomplished by tumbling or agitating the kaolin in the presence of the ammonia, passing ammonia gas through the kaolin with or without agitation. The apparatus and means for treating finely-divided solids with gases are well known to the art.

In order to more clearly illustrate my invention, representative modes of carrying the same into effect and the advantageous results to be obtained thereby, the following examples are given:

*Example I*

Three hundred grams of dried and finely ground kaolin, which originally produced a pH of 4.5 in a 30% slurry, were placed in a liter flask and 0.245 gram of ammonia gas was introduced by measuring in 325 c. c. of the gas. The flask was stoppered and shaken for 30 seconds. The temperature of the kaolin noticeably increased. The kaolin was immediately poured from the flask and spread on paper in a layer ¼ inch thick. No odor of ammonia could be observed. The ph, of a 30% slurry of the freshly treated kaolin in water, was found to be 7.3. After an exposure of the treated kaolin to air for 15 days in the thin layer, the pH, of a 30% slurry of the kaolin, was still 7.2.

Samples of the untreated kaolin, the treated kaolin immediately after treatment, and the treated kaolin after 15 days' exposure, were tested in the following rubber compound which was vulcanized for 30 minutes at 260° F.

Smoked sheets _____ 100
Kaolin _____ 104
Sulfur _____ 3
Zinc oxide _____ 5
Stearic acid _____ 2
Mercapto benzothiazole _____ 1

|  | Load at 300% Elongation, Lbs./in.$^2$ | Tensile at Break, Lbs./in.$^2$ | Time of Vulcanization, In Minutes, Required To Reach 1,400 Lbs. Modulus |
|---|---|---|---|
| Untreated Kaolin | 1,280 | 2,170 | 45 |
| Freshly treated Kaolin | 1,420 | 2,820 | 26 |
| Treated Kaolin After Exposure | 1,480 | 2,790 | 25 |

*Example II*

Kaolin, composed largely of particles less than 3 microns and having a moisture content of 0.75%, was passed through a section of conveyor screw 10 feet long at the rate of 20 pounds per minute. Ammonia gas was introduced beneath the cover of the conveyor trough at the entrance end at the rate of 0.02 pound per minute, which is 0.1% on the weight of the kaolin. The ammonia was completely absorbed and the pH, of a 30% aqueous slurry of the treated kaolin, was 8.3. The treated kaolin was packed and stored in 100 pound paper packages. After three days' storage, the treated kaolin produced a pH of 7.5 in a 30% aqueous slurry and, after 10 days, it produced a pH of 7.2. After three months' storage, the kaolin produced a pH of 7.1.

*Example III*

A sample of rubber grade kaolin, originally producing a pH of 4.3 in a 30% aqueous slurry, was treated with ammonia gas to cause the kaolin to produce a pH of 7.1 in a 30% aqueous slurry. The treated kaolin was spread in a thin layer and held at 90° C. for 5 days. During this time, the pH dropped only to 6.9.

It will be understood that the preceding examples have been given for illustrative purposes solely and that my invention is not limited to the specific embodiments disclosed therein. It will be apparent to those skilled in the art that the methods of bringing the ammonia into contact with the kaolin may be widely varied. Also, ordinary commercial aqueous ammonium hydroxide may be employed in place of the gaseous ammonia, because the small amount of water so introduced is not sufficient to noticeably alter the kaolin from the dry state. Also, much larger amounts of ammonia may be employed, if desired, but without advantage since the excessive amounts of ammonia will readily escape from the kaolin and be wasted.

From the preceding description it will be apparent that I have provided a method for greatly improving the properties of kaolin particularly for use as a compounding ingredient for rubber. Also, I have provided a reaction product of kaolin and ammonia which has improved properties and does not have the disadvantageous properties of the kaolin prepared by other methods. Due to the known properties of kaolin and of the materials of which it is composed, it was wholly unexpected that kaolin would react with ammonia. Also, since it has been common to employ acidic materials such as stearic acid in the compounding of rubber without deleteriously effecting the vulcanization of rubber, it was unobvious that the treatment of kaolin with ammonia would have any effect on its action toward the vulcanization of rubber. Therefore, it will be apparent that my invention produces new, unobvious, and unexpected results and constitutes a valuable advance and contribution to the art.

I claim:

1. The process for improving the properties of raw kaolin which consists essentially of drying the raw kaolin, grinding it to a finely divided form and then mixing and reacting the dry, finely-divided kaolin with from about 0.05% to about 0.1% by weight of ammonia in the form of a member of the group consisting of ammonia gas and ordinary commercial aqueous ammonium hydroxide.

2. The process for improving the properties of raw kaolin which consists essentially of drying the raw kaolin, grinding it to a finely divided form and then mixing and reacting the dry, finely-divided kaolin with from about 0.05% to about 0.1% by weight of ammonia gas.

3. The process for improving the properties of raw kaolin which consists essentially of drying the raw kaolin, grinding it to a finely divided form and then mixing and reacting the dry, finely-divided kaolin with from about 0.08% to about 0.1% by weight of ammonia in the form of a member of the group consisting of ammonia gas and ordinary commercial aqueous ammonium hydroxide.

4. The process for improving the properties of raw kaolin which consists essentially of drying the raw kaolin, grinding it to a finely divided form and then mixing and reacting the dry, finely-divided kaolin with from about 0.08% to about 0.1% by weight of ammonia gas.

References Cited in the file of this patent

UNITED STATES PATENTS

| 1,001,413 | Keppeler et al. | Aug. 22, 1911 |
| 1,385,716 | Ryan | July 26, 1921 |
| 1,418,976 | Shridowitz | June 6, 1922 |
| 1,730,485 | Teague | Oct. 8, 1929 |
| 1,787,008 | Liebnecht | Dec. 30, 1930 |
| 1,840,363 | Illner et al. | Jan. 12, 1932 |
| 2,247,467 | Barker et al. | July 1, 1941 |
| 2,314,188 | Allen | Mar. 16, 1943 |
| 2,339,594 | Williams | Jan. 18, 1944 |

FOREIGN PATENTS

| 2,421 | Great Britain | of A. D. 1854 |
| 2,379 of 1911 | Great Britain | Jan. 11, 1912 |

OTHER REFERENCES

Mellor, "Comprehensive Treatise on Inorganic and Theoretical Chemistry," vol. 6, page 491 (1925) Longmans, Green and Co., N. Y. C.